United States Patent [19]

Moyers

[11] Patent Number: 4,544,844
[45] Date of Patent: Oct. 1, 1985

[54] IMAGE TUBE IR ILLUMINATOR INDICATOR

[75] Inventor: Thomas E. Moyers, Woodbridge, Va.

[73] Assignee: The United States of America as represented by the Secretary of the Army, Washington, D.C.

[21] Appl. No.: 547,522

[22] Filed: Oct. 31, 1983

[51] Int. Cl.[4] .............................................. H01J 31/50
[52] U.S. Cl. ................................................... 250/330
[58] Field of Search ............... 250/330, 331, 332, 333, 250/334, 341

[56] References Cited

U.S. PATENT DOCUMENTS

| | | | |
|---|---|---|---|
| 4,000,419 | 12/1976 | Crost et al. | 250/213 VT |
| 4,160,907 | 7/1979 | Bly | 250/330 |
| 4,328,516 | 5/1982 | Colpack et al. | 358/113 |
| 4,417,814 | 11/1983 | Doliber | 356/252 |

Primary Examiner—Alfred E. Smith
Assistant Examiner—Constantine Hannaher
Attorney, Agent, or Firm—Max L. Harwell; Robert P. Gibson; Anthony T. Lane

[57] ABSTRACT

An infrared (IR) illuminator indicator which has a fiber optics light guide that channels the IR radiation from an IR radiation source in the illuminator to the faceplate of an image tube as an indicator mark. The image tube converts the IR radiation to the visible spectrum. If the operator of the image tube attempts to operate the IR illuminator at large ranges, or if a near target is suddenly removed so that the IR radiation suddenly reached a much larger range, the image tube gain will suddenly increase to compensate for less reflected radiation. With the fiber optics light guide channeling a constant amount of IR radiation from the IR radiation source to the input of the faceplate, the enhanced gain of the image tube automatically brightens the indicator mark to the observer of the image tube and thus indicates the need to immediately turn off the IR radiation source to avoid detection by the enemy.

6 Claims, 3 Drawing Figures

IMAGE TUBE IR ILLUMINATOR INDICATOR

The invention described herein may be manufactured, used and licensed by the U.S. Government for governmental purposes without the payment of any royalties thereon.

BACKGROUND OF THE INVENTION

1. Field of the invention

The invention relates to an image tube IR illuminator indicator that monitors when IR illumination from an associated IR illuminator is present and especially when the IR illuminator is activated with the image tube in a high gain condition.

2. Description of the prior art

When using an active IR illuminator in battlefield conditions the problem of being detected by the enemy is always present. Many measures have been taken to restrict excessive usage of an IR radiation source, or to have the IR radiation source activated only when actually needed in battlefield surveillance conditions. However, human error sometimes occurs in which the IR illuminator is inadvertently left activated at times when the illuminator should be turned off.

The present invention provides an automatic means of indicating to an image tube operator when an IR illuminator is operating and possibly giving away the position of the illuminator to an enemy.

SUMMARY OF THE INVENTION

The present invention is comprised of an IR illumination indicator provided by an image tube operating with an associated IR illuminator in which a small portion of the IR radiation is directly channeled to the input of the image tube as an indicator mark for observance by an operator when the IR illuminator is turned on. The indicator is preferably comprised of a fiber optics guide means, such as a fiber optic light guide, positioned between an IR radiation source of the IR illuminator and the input faceplate of an image tube for channelling the small portion of the IR radiation from the IR radiation source directly to the input of the tube for conversion to the visible spectrum. That is, the input end of the fiber optics guide means is in the proximity of the IR radiation source and the output end is directed against the input faceplate of the image tube to provide the indicator mark. The indicator mark may be in the form of a diffuse area that is out of focus by having the output end of the fiber optics light guide slightly removed from the surface of the input faceplate or be aimed at an angle to the surface. It should be noted that the IR illuminator has constant gain and is switchable off and on by the operator of the image tube as needed.

The present invention prevents an operator from attempting to use the IR illuminator in a dangerous environment where an enemy can detect radiation from the illuminator. Since the IR radiation would be mostly transmitted and therefore very little IR reflective light be present at the input to the image tube under these conditions, a high gain would immediately be established in the image tube and the indicator mark would be detected easily by the operator. An example would be if the operator attempts to look out across an open field with the IR illuminator in the activated condition after using the tube at close range, such as for reading maps, where a high level of reflected IR illumination has been established and the gain of the image tube was greatly reduced. The indicator mark may not even be noticed by the operator at the reduced gain. However, when the operator attempts to look across an open field with the image tube and the IR illuminator inadvertently remains in an activated condition, the image tube will move into a high gain condition. It should be noted that it is at this time the IR radiation transmitted across the open field is more likely to be detected by an enemy. The image tube moves into the high gain condition because of the reduced reflected IR illumination. The indicator mark however is greatly enhanced by the gain of the tube since the amount of IR illumination on the input faceplate directly from the IR illuminator remains constant. It is this suddenly enhanced indicator mark viewed by the operator which alerts the operator to immediately turn off the IR illuminator under these conditions.

The fiber optics light guide between the IR radiation source and the input faceplate of the image tube is preferably totally enclosed on the interior of a one housing type IR viewer, such as the head mounted goggle tube, but in other instances may be connected remotely from the IR radiation source of an IR illuminator to a separately housed IR-to-visible converter image tube.

The invention will become better understood by the following detailed description with reference to the following drawings.

DETAILED DESCRIPTION OF THE PREFERRED EMBODIMENT

Figure 1:
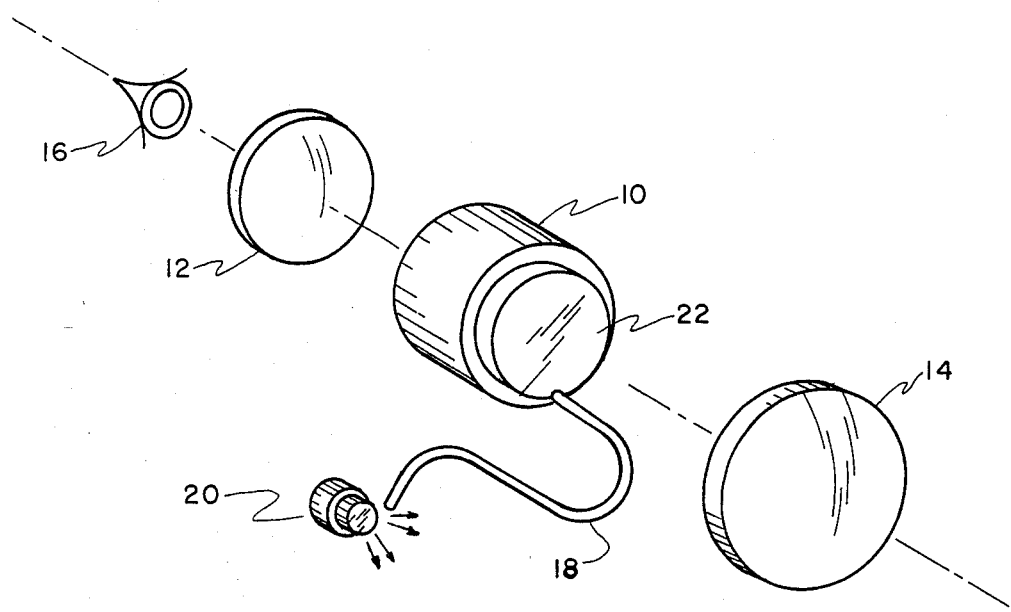
FIG. 1 is a schematic plan view of the IR illuminator indicator of the present invention.

Refer now to FIG. 1 for an explanation of the image tube IR illuminator indicator of the present invention. A light-emitting-diode (LED) 20 is shown as emitting radiation therefrom. The radiation is preferably in the near IR spectrum. The radiation from 20 is not only emitted directly forward from the IR illuminator toward a target but is channeled through a fiber optic light guide 18 to a small area, denoted as the indicator mark, on the input faceplate 22, which is normally a fiber optics faceplate, of an image tube 10. The IR radiation that is emitted from LED 20 in the forward direction is preferably reflected off a close-in target and returned to the image tube 10 through objective lens 14 and is observed by an observer, represented by eye 16, looking through eyepiece 12.

Figure 2:
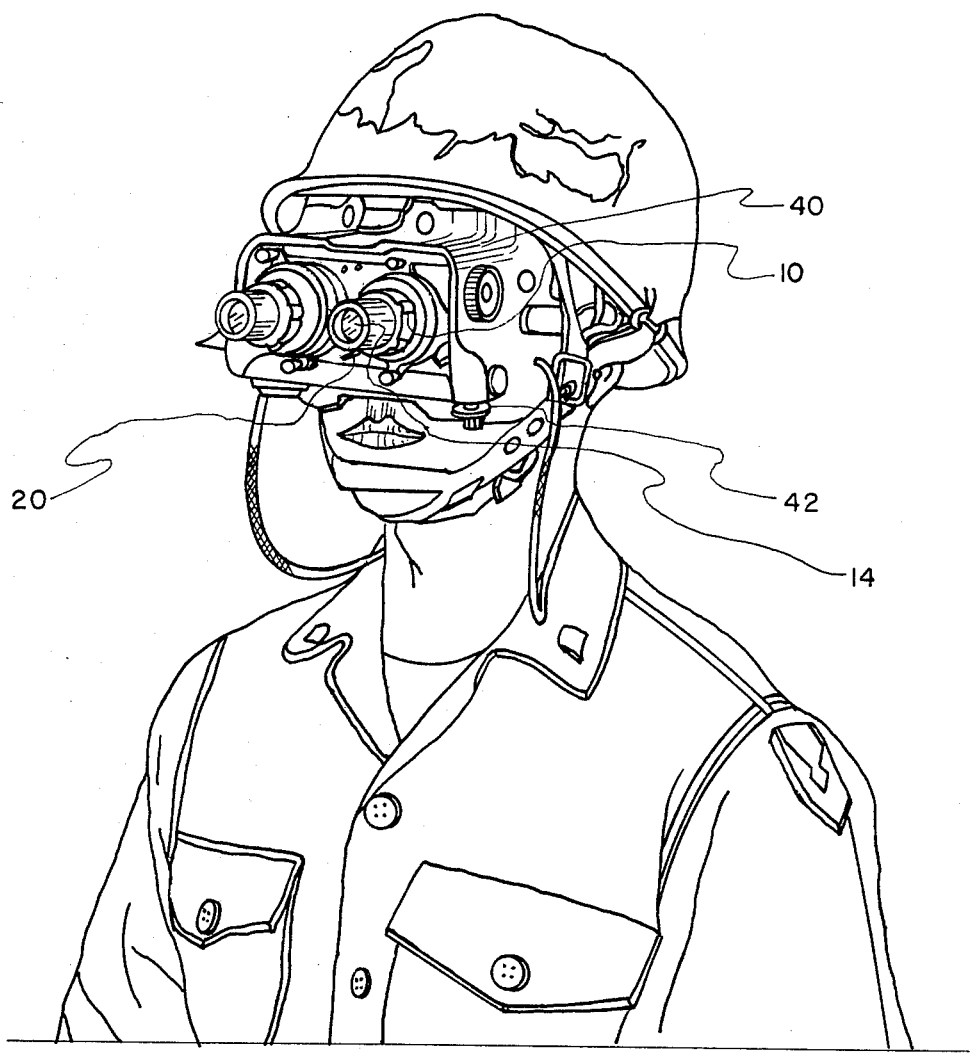
FIG. 2 shows a pictoral view of a one housing type head mounted goggle tube embodiment of the present invention.

Refer now also to FIG. 2 which shows a head mounted goggle tube 40 in which the present IR illuminator indicator may be practiced. It should be noted that the indicator may be used with any image tube that is sensitive to IR radiation and converts to visible radiation. The fiber optic guide 18, inside the tube 40 in FIG. 2, has its input end positioned to receive the IR radiation directly from the IR radiation source and the output end directed to the input faceplate 22 of the image tube 10.

The LED 20, which is preferably a GaAs type, is usually positioned in the center portion of goggle tube 40 facing forward and emits radiation at about 8500 Å. Some of the numerical references used in FIG. 2 are the same as in FIG. 1, and represent the same items. That is, objective lens 14 is visible in the front of tube 40 with the image tube 10 directly behind 14.

Figure 3:
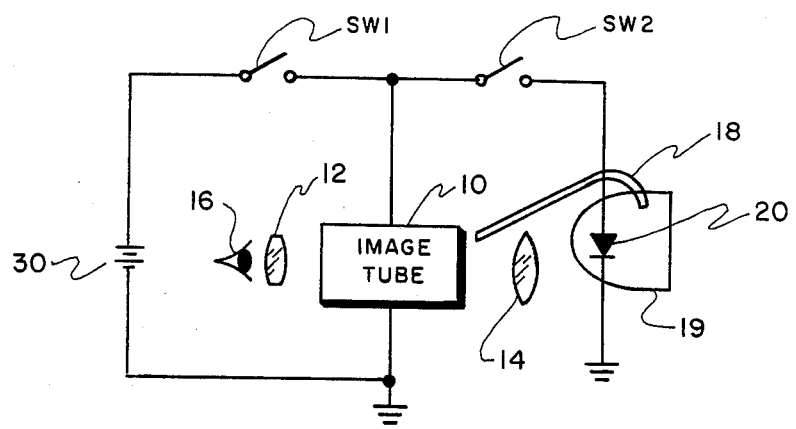
FIG. 3 is a schematic circuit of the various switching of the embodiment of FIG. 2.

Refer now to FIG. 3 along with FIG. 1 and FIG. 2. The LED 20 is preferably enclosed in a reflector, represented by numeral 19, which may be epoxied in the goggle tube 40 along with the LED 20. FIG. 3 illustrates schematically various possible switching arrangements of a rotary switch 42 having the three positions of "on", "off", and "IR" on the goggle tube 40, with switch 42 illustrated in the off position. When switch SW1 is closed and switch SW2 is open, switch 42 is in the on or the visible mode. When both of switches SW1 and SW2 are closed, power from voltage source 30 is applied to image tube 10 and to LED 20 simultaneously, and switch 42 is in the IR mode of operation. Fiber optic guide 18, lenses 12 and 14, image tube 10 and observer 16 are all shown in relation to the LED 20 as was shown by FIG. 1. Switch 42 is used in the IR mode of the present invention to alert the operator, who is viewing through tube 40, when the IR radiation source is activated on so that accidental use of the IR illuminator under dangerous conditions can be prevented. The operator of the goggle tube 40 may rotate switch 42 to the off position or to only the visible position from the IR mode as deemed necessary.

When using the IR illuminator under normal operation, such as map reading under no light or low light levels, the gain of the image tube is down due to the high reflective light level and the indicator is not a serious distraction to the observer since the indicator is hardly visible. However, when the observer attempts to visibly observe with the image tube at great range and the IR illuminator is not switched off by switch 42, the gain of the image tube would immediately rise causing the indicator mark to become very bright and alert the observer to turn off the IR illuminator.

While a specific embodiment of the invention has been shown and described, other embodiments within the scope of the invention may be obvious to one skilled in the art.

I claim:

1. An IR illuminator indicator in an IR to visible imaging system, said indicator comprising:

an IR radiation source in an IR illuminator;

an image tube having switchable means for switching said IR radiation source on and off; and a fiber optics guide means having an input end and an output end respectively connected between the proximity of said IR radiation source and an input faceplate of said image tube for directly channeling a small portion of the IR radiation from said IR radiation source to an indicator mark on said input faceplate in which said IR radiation source simultaneously emits IR radiation straight forward toward a target and into said input end of said fiber optics guide means wherein reflected IR radiation from said target and from said indicator mark is detected by an observer viewing said image tube in which any sudden gain of said image tube caused by an operator of the image tube changing from viewing a near view highly reflective target to a less reflective distant target area enhances the brightness of said indicator mark when compared with said reflected IR radiation being observed and said IR radiation source may be turned off to prevent possible enemy detection in said distant target area.

2. An indicator system as set forth in claim 1 wherein said IR radiation source is a light emitting diode.

3. An indicator system as set forth in claim 2 wherein said light emitting diode is a Gallium Arsenide diode which emits in the 8500 Å wavelength.

4. An indicator system as set forth in claim 3 wherein said image tube is a head mounted goggle tube and said IR radiation source is mounted therein to simultaneously emit IR radiation straight forward toward a target and into said input end of said fiber optic guide means wherein said fiber optic guide means is mounted entirely inside said goggle tube and has an output end directed to said indicator mark on said input faceplate.

5. An indicator system as set forth in claim 1 wherein said indicator mark is a small diffuse area that is out of focus by the output end of said fiber optics guide means being backed off from the surface of said input faceplate.

6. An indicator system as set forth in claim 1 wherein said indicator mark is a small diffuse area covered by IR radiation exiting said output end of said fiber optics guide means at an angle to the surface of said input faceplate.

* * * * *